United States Patent
Ogihara

(10) Patent No.: US 11,518,197 B2
(45) Date of Patent: Dec. 6, 2022

(54) TIRE

(71) Applicant: SUMITOMO RUBBER INDUSTRIES, LTD., Hyogo (JP)

(72) Inventor: Sawa Ogihara, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 255 days.

(21) Appl. No.: 16/448,216

(22) Filed: Jun. 21, 2019

(65) Prior Publication Data
US 2020/0016938 A1 Jan. 16, 2020

(30) Foreign Application Priority Data

Jul. 10, 2018 (JP) .............................. JP2018-130911

(51) Int. Cl.
| | |
|---|---|
| B60C 13/00 | (2006.01) |
| B29D 30/06 | (2006.01) |
| B29D 30/72 | (2006.01) |
| B60C 13/02 | (2006.01) |

(52) U.S. Cl.
CPC ........ B60C 13/001 (2013.01); B29D 30/0606 (2013.01); B29D 30/72 (2013.01); B60C 13/02 (2013.01); *B29D 2030/0612* (2013.01); *B29D 2030/726* (2013.01)

(58) Field of Classification Search
CPC ........ B60C 13/001; B60C 13/02; B60C 13/00
See application file for complete search history.

(56) References Cited

U.S. PATENT DOCUMENTS

| | | | |
|---|---|---|---|
| 6,253,815 B1 * | 7/2001 | Kemp ....................... | B44F 1/02 |
| | | | 152/523 |
| 2010/0294412 A1 * | 11/2010 | Inoue ....................... | B60C 13/02 |
| | | | 152/523 |
| 2011/0139326 A1 | 6/2011 | Nukushina | |

(Continued)

FOREIGN PATENT DOCUMENTS

| | | | |
|---|---|---|---|
| CN | 103660806 A | * | 3/2014 |
| JP | 7-164831 A | | 6/1995 |

(Continued)

OTHER PUBLICATIONS

JP H09-86106 Machine Translation; Wakabayashi, Noboru (Year: 1997).*

(Continued)

*Primary Examiner* — Robert C Dye
*Assistant Examiner* — Nicholas J Weiler
(74) *Attorney, Agent, or Firm* — Greenblum & Bernstein, P.L.C.

(57) ABSTRACT

A tire that includes a decorative pattern formed on a surface of a sidewall portion. The decorative pattern is formed such that a plurality of ridges that extend in a tire radial direction are aligned in a tire circumferential direction so as to form gaps. A transverse cross-section of each ridge is tapered so as to gradually reduce a length along the surface such that the greater a distance from the surface is, the less the length along the surface is. The decorative pattern is structured so as to satisfy expressions (1) and (2):

$$20 \leq A \leq 40 \tag{1}$$

$$0.15 \leq C \leq 0.25 \tag{2}$$

wherein A represents a taper angle (degree) of the ridge, and C represents a minimum length (mm) of each gap measured along the surface.

16 Claims, 5 Drawing Sheets

(56) References Cited

U.S. PATENT DOCUMENTS

| | | | | |
|---|---|---|---|---|
| 2015/0336432 A1* | 11/2015 | Iwabuchi | ................ | B60C 13/04 |
| | | | | 152/524 |
| 2018/0072110 A1* | 3/2018 | Kagimoto | ................. | B60C 9/18 |
| 2019/0030960 A1* | 1/2019 | Iwabuchi | ................ | B60C 11/13 |

FOREIGN PATENT DOCUMENTS

| | | | |
|---|---|---|---|
| JP | H09-86106 A | * | 3/1997 |
| JP | 2017001438 A | | 1/2017 |

OTHER PUBLICATIONS

CN 103660806 Machine Translation; Ikebayashi, Hiroyuki (Year: 2014).*

JP H07-164831 Machine Translation; Kikuchi, Shinobu (Year: 1995).*

European Search Report, European Patent Office, Application No. 19182862.3, dated Oct. 16, 2019.

* cited by examiner

TIRE

BACKGROUND OF THE INVENTION

Field of the Invention

The present invention relates to a tire having a decorative pattern formed on a surface of a sidewall portion.

Description of the Background Art

In general, a sidewall portion of a tire has thin rubber, and, therefore, recesses and projections called dents and bulges become conspicuous due to, for example, residual air and a joint portion of a carcass that is an internal structure. Such recesses and projections deteriorate outer appearance of the tire.

Japanese Laid-Open Patent Publication No. 7-164831 suggests a tire which has a strip-like design in which multiple ridges are disposed on a surface of a sidewall at a predetermined pitch such that the recesses and projections are unlikely to become conspicuous. Such a strip-like design is formed by groove portions (reversed pattern of the ridges) formed in a molding surface of a vulcanization mold for the tire.

SUMMARY OF THE INVENTION

In order to make the recesses and projections less conspicuous, it is important to form a gap between the adjacent ridges so as to make the gap small, form the gap portion so as to be viewed as being dark (black), and clarify contrast of light on the strip-like design.

However, when the gap formed between adjacent ridges is made small, multiple ridges are formed in the tire circumferential direction. According thereto, a proportion of groove portions formed in a molding surface of a vulcanization mold is also increased. Laser, particles, or the like used for cleaning the molding surface are unlikely to be easily applied into the groove portions. Therefore, a problem arises that efficiency for cleaning the vulcanization mold is reduced. Accordingly, there is room for further improvement in that both outer appearance of the tire and efficiency for cleaning the vulcanization mold are to be improved.

The present invention is made in view of the aforementioned circumstance, and a main object of the present invention is to provide a tire that allows improvement of both outer appearance of the tire and efficiency for cleaning a vulcanization mold.

The present invention is directed to a tire that includes a decorative pattern formed on a surface of a sidewall portion. In the tire, the decorative pattern is formed such that a plurality of ridges that extend in a tire radial direction are aligned in a tire circumferential direction so as to form gaps. A transverse cross-section of each ridge is tapered so as to gradually reduce a length along the surface such that the greater a distance from the surface is, the less the length along the surface is. The decorative pattern is structured so as to satisfy expressions (1) and (2), $$20 \leq A \leq 40 \tag{1}$$

$$0.15 \leq C \leq 0.25 \tag{2}$$

wherein A represents a taper angle (degree) of the ridge, and C represents a minimum length (mm), of each gap, measured along the surface.

In the tire according to the present invention, the transverse cross-section of the ridge may have a top-side shorter base that extends along the surface, at a position that is farthest from the surface, and the decorative pattern may be structured so as to further satisfy expressions (3) and (4), $$0.2 \leq C/D \leq 0.4 \tag{3}$$

$$1 \leq B/C \leq 3 \tag{4}$$

wherein B represents a length (mm), of the top-side shorter base, measured along the surface, and D represents an arrangement pitch (mm) at which the ridges are arranged in the tire circumferential direction.

In the tire according to the present invention, the arrangement pitch D for the ridges may be 0.13 to 2.1 mm.

In the tire according to the present invention, the length B of the top-side shorter base may be 0.05 to 0.4 mm.

In the tire according to the present invention, the transverse cross-section of the ridge may have a triangular shape having a vertex at a position that is farthest from the surface, and the decorative pattern may be structured so as to further satisfy expression (5), $$0.2 \leq C/D \leq 0.4 \tag{5}$$

wherein D represents an arrangement pitch at which the ridges are arranged in the tire circumferential direction.

In the tire according to the present invention, one of paired side surfaces that extend from the vertex to the surface may be orthogonal to the surface.

In the tire according to the present invention, a height of the ridge from the surface may be 0.1 to 0.5 mm.

In the tire of the present invention, the decorative pattern is formed on the surface of the sidewall portion. The decorative pattern is formed such that a plurality of ridges that extend in the tire radial direction are aligned in the tire circumferential direction so as to form the gaps. The decorative pattern having such a structure can prevent recesses and projections on the sidewall portion from becoming conspicuous, and can improve outer appearance of the tire.

The transverse cross-section of the ridge is tapered so as to gradually reduce the length along the surface such that the greater the distance from the surface is, the less the length along the surface is. The decorative pattern is structured so as to satisfy expressions (1) and (2).

$$20 \leq A \leq 40 \tag{1}$$

$$0.15 \leq C \leq 0.25 \tag{2}$$

wherein A represents the taper angle (degree) of the ridge, and C represents the minimum length (mm), of the gap, measured along the surface.

The decorative pattern is formed such that the taper angle A of the ridge is not greater than 40 degrees. Therefore, an incident angle and a reflection angle of light that is incident so as to be perpendicular to the surface can be reduced at the side surface of the ridge. Thus, the decorative pattern allows reflection from the side surface toward the outside of the tire to be weakened. Furthermore, the decorative pattern is formed such that the minimum length C of the gap is not greater than 0.25 mm, and thus allows reflection from the surface toward the outside of the tire to be weakened. Thus, the decorative pattern allows the gap to be viewed as being darker (black) and allows contrast of light between the ridge and the gap to be clarified. Thus, the recesses and projections can be further inhibited from becoming conspicuous.

Meanwhile, the decorative pattern is formed such that taper angle A is not less than 20 degrees, and, thus, the wall surface of the groove portion (reversed pattern of the ridge), of the vulcanization mold, for forming the ridge can be appropriately expanded. Therefore, laser, particles, and the like can be easily applied into the groove portions when the mold is cleaned. Furthermore, the decorative pattern is formed such that the minimum length C of the gap is not less than 0.15 mm, and, thus, the number of the ridges in the tire circumferential direction is prevented from excessively increasing. Thus, in the present invention, the proportion of the groove portions is reduced, and efficiency for cleaning the vulcanization mold can be improved while the recesses and projections are inhibited from becoming conspicuous.

DESCRIPTION OF THE PREFERRED EMBODIMENTS

Hereinafter, an embodiment of the present invention will be described with reference to the drawings.

Figure 1:
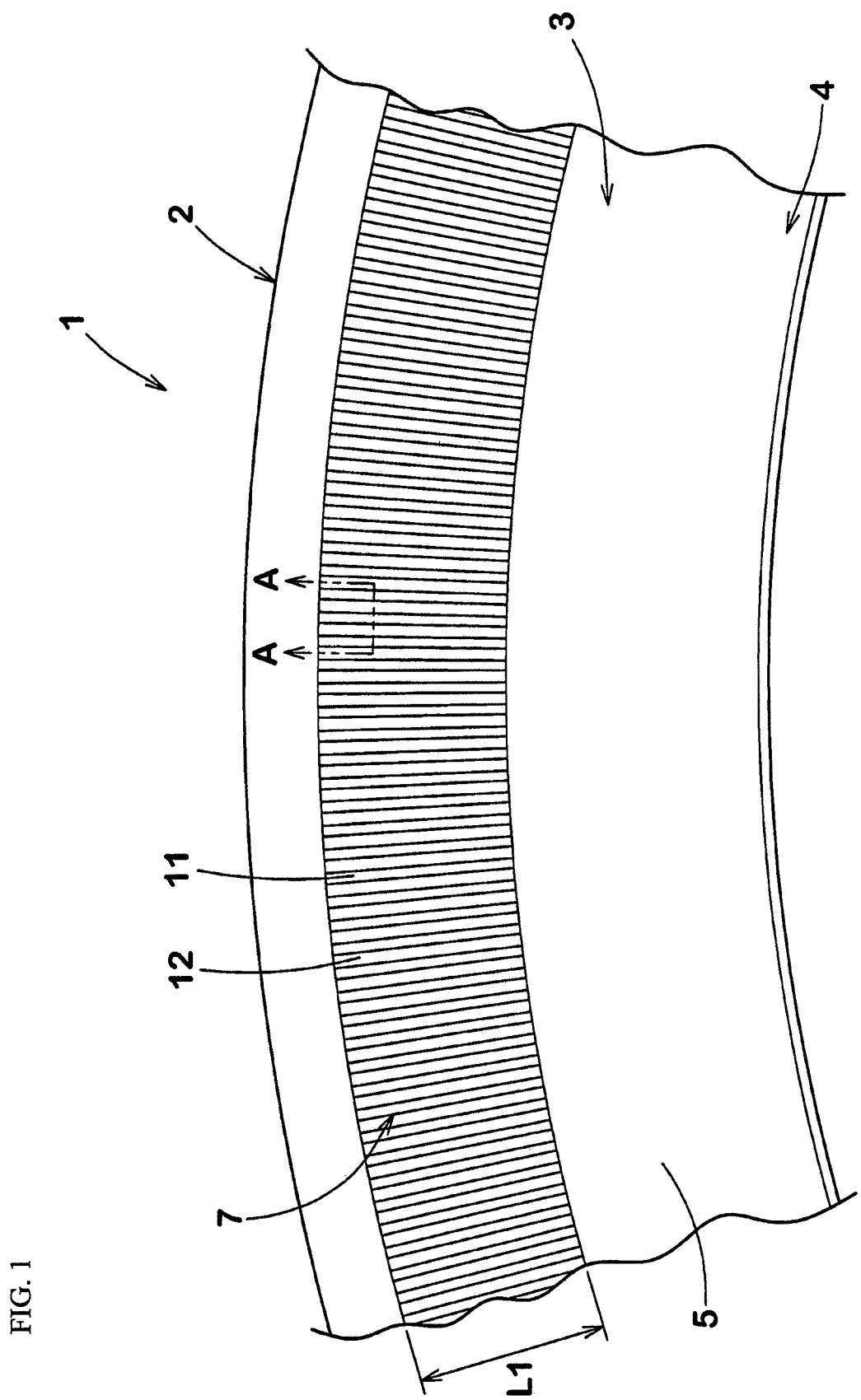
FIG. 1 is a partial side view of an example of a tire.

FIG. 1 is a partial side view of an example of a tire. A tire 1 of the present embodiment includes: a tread portion 2; a pair of sidewall portions 3 that extend from both side ends of the tread portion 2 in the radially inward direction of the tire; and bead portions 4 that are continuous with inner portions of the sidewall portions 3 in the tire radial direction. In the present embodiment, the tire 1 for a passenger car is described as an example. However, the tire 1 is not limited to such a tire, and may be, for example, a two-wheeled automotive vehicle tire or a heavy duty tire.

In the description herein, unless otherwise specified, dimensions and the like of components of the tire 1 represent values measured in a state (normal state) in which the tire 1 is mounted on a normal rim (not shown) and is inflated to a normal internal pressure, and no load is applied to the tire.

The "normal rim" represents a rim that is defined by a standard, in a standard system including the standard with which the tire complies, for each tire, and is, for example, the "standard rim" in the JATMA standard, the "Design Rim" in the TRA standard, or the "Measuring Rim" in the ETRTO standard.

The "normal internal pressure" represents an air pressure that is defined by the standard for each tire, and is the "maximum air pressure" in the JATMA standard, the maximum value recited in the table "TIRE LOAD LIMITS AT VARIOUS COLD INFLATION PRESSURES" in the TRA standard, or the INFLATION PRESSURE' in the ETRTO standard. In the case of a tire for a passenger car, the normal internal pressure is 180 kPa.

The tire 1 of the present embodiment has a decorative pattern 7 formed on a surface 5 of the sidewall portion 3. In the present embodiment, the decorative pattern 7 is formed so as to be annular as viewed from the side surface of the tire 1. However, the decorative pattern 7 is not limited to such a mode. The decorative pattern 7 may be, for example, formed in a strip-like shape in which both ends in the tire circumferential direction are disconnected, or the decorative patterns 7 may be disposed at intervals in the tire circumferential direction. Furthermore, for example, characters (not shown) representing a logo mark, a brand name, or the like of the tire 1 may be formed on the decorative pattern 7 so as to be, for example, relief. A length L1 of the decorative pattern 7 in the tire radial direction is not particularly limited. In the present embodiment, the length L1 is preferably about 5 to 30% of the tire cross-sectional height.

Figure 2:
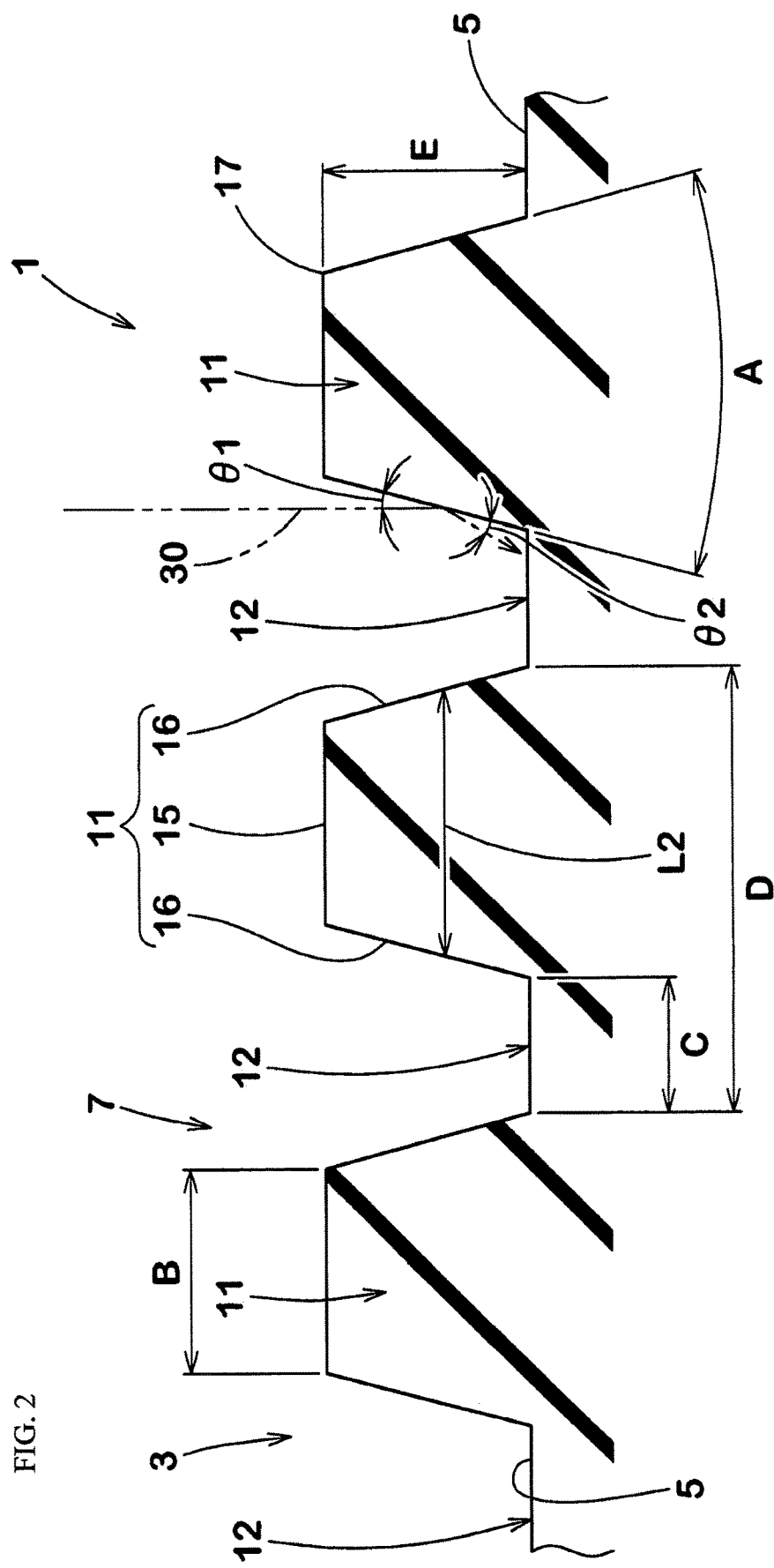
FIG. 2 is a cross-sectional view taken along a line A-A in FIG. 1.
Figure 3:
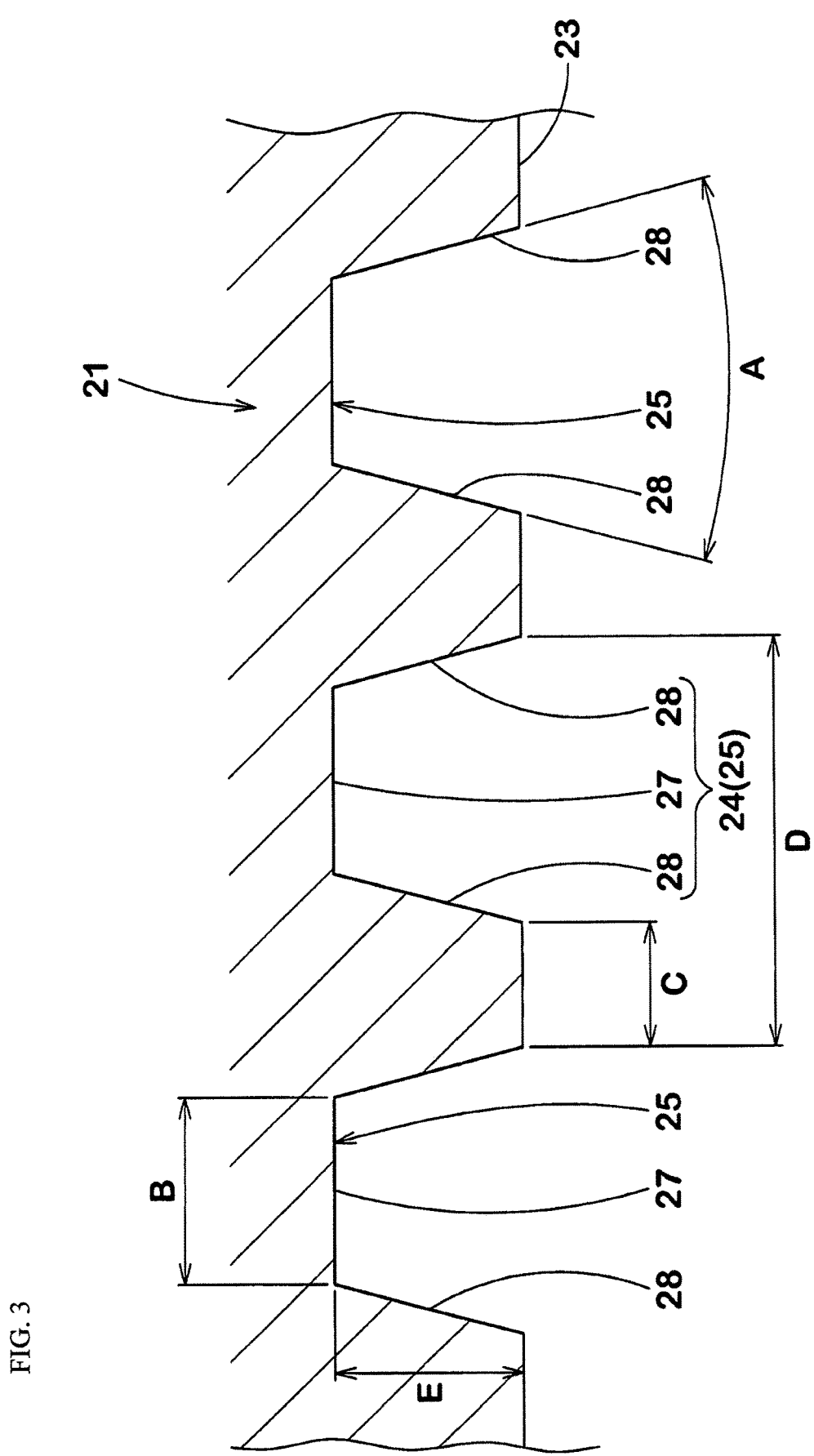
FIG. 3 is a partial cross-sectional view of examples of a vulcanization mold and a green tire in a vulcanization step.

FIG. 2 is a cross-sectional view taken along a line A-A in FIG. 1. FIG. 3 is a partial cross-sectional view of an example of a pattern forming portion 24 in a vulcanization mold 21. As shown in FIG. 2, the decorative pattern 7 is formed such that a plurality of ridges 11 that extend in the tire radial direction are aligned in the tire circumferential direction so as to form gaps 12 therebetween. The decorative pattern 7 having such a structure is formed by groove portions (reversed patterns of the ridges 11) 25 of the pattern forming portions 24 in a molding surface 23 of the vulcanization mold 21, shown in FIG. 3, for the tire as in a conventional art.

As shown in FIG. 1 and FIG. 2, each ridge 11 is formed as a raised-line-like projection that projects from the surface 5 of the sidewall portion 3 and extends in the tire radial direction. As shown in FIG. 2, the transverse cross-section of the ridge 11 is tapered so as to gradually reduce a length L2 along the surface 5 such that the greater the distance from the surface 5 of the sidewall portion 3 is, the less the length L2 along the surface 5 is.

In the present embodiment, the transverse cross-section of the ridge 11 has a top-side shorter base 15 that extends along the surface 5, at a position that is farthest from the surface 5. Thus, the transverse cross-section of the ridge 11 is formed in a trapezoidal shape which has the top-side shorter base 15 and a pair of side surfaces 16, 16 that extend from the top-side shorter base 15 to the surface 5. In the drawings, corner portions 17 of the ridge 11 are illustrated as sharp edges. However, examples of the "trapezoidal shape" include a shape in which the corner portion 17 has a chamfered portion having a small curvature radius, in consideration of the size of the ridge 11 and a rubber molding technique.

The decorative pattern 7 having such a structure allows the gap 12 between the adjacent ridges 11 and 11 to be viewed as being dark (black), and allows contrast of light between the ridges 11 and the gaps 12 to be clarified. Thus, the decorative pattern 7 can function to hide the recesses and projections (dents and bulges) caused by, for example, residual air and a joint portion of a carcass (not shown) which is an internal structure of the tire 1, so as to inhibit the recesses and projections (dents and bulges) from becoming conspicuous, whereby the decorative pattern 7 contributes to improvement of outer appearance of the tire 1.

The decorative pattern 7 (shown in FIG. 2) of the present embodiment is structured so as to satisfy the following expressions (1) and (2).

$$20 \leq A \leq 40 \tag{1}$$

$$0.15 \leq C \leq 0.25 \tag{2}$$

wherein A represents a taper angle (degree) of the ridge 11, and C represents a minimum length (mm), of the gap 12, measured along the surface 5.

According to expression (1), the taper angle A of the ridge 11 is set to be not greater than 40 degrees. In general, the outer appearance as viewed from the front thereof is particularly important in order to improve the outer appearance of the sidewall portion 3 of the tire 1. In the decorative pattern of the present embodiment, the taper angle A of the ridge 11 is not greater than 40 degrees, and, thus, an incident angle θ1 and a reflection angle θ2 of light 30 (indicated by an alternate long and two short dashes line in FIG. 2) which is incident so as to be perpendicular (along the tire axial direction) to the surface 5 of the sidewall portion 3 can be reduced at the side surface 16 of the ridge 11. Therefore, at the decorative pattern 7, reflection from the side surface 16 of the ridge 11 toward the outside of the tire 1 can be weakened.

Furthermore, on wall surfaces (that is, side surface forming portions for forming the side surfaces 16 of the ridge 11) 28, 28 of the groove portion 25, of the vulcanization mold 21, for forming the ridge 11 as shown in FIG. 3, incident angles and reflection angles of laser and particles used for cleaning the vulcanization mold 21 can be reduced. Thus, diffuse reflection of laser and particles can be caused in the move portion 25, whereby dirt attached to the groove portion 25 can be efficiently removed.

According to expression (2), the minimum length C of the gap 12 is set to be not greater than 0.25 mm. Thus, the decorative pattern 7 of the present embodiment allows reflection from the surface 5 of the sidewall portion 3 toward the outside of the tire 1 to be weakened. Therefore, the decorative pattern 7 of the present embodiment allows the gap 12 to be viewed as being darker (black), and allows contrast of light between the ridge 11 and the gap 12 to be clarified. Accordingly, the decorative pattern 7 allows the outer appearance of the tire 1 to be improved since the recesses and projections (not shown) formed in the sidewall portion 3 are made less conspicuous.

Meanwhile, when the taper angle A of the ridge 11 and the minimum length C of the gap 12 are reduced, multiple ridges 11 are formed in the tire circumferential direction. According thereto, a proportion (the number) of the groove portions 25 formed in the molding surface 23 of the vulcanization mold 21 shown in FIG. 3 is also increased. Laser, particles, and the like used for cleaning the molding surface 23 are not easily applied into the groove portions 25, so that efficiency for cleaning the vulcanization mold is reduced.

In the present embodiment, according to expression (1), the taper angle A is set to be not less than 20 degrees. Thus, as shown in FIG. 3, in the present embodiment, at least one (in the present embodiment, both) of the wall surfaces 28 and 28 of the groove portion 25, of the vulcanization mold 21, for forming the ridge 11 can be appropriately expanded in the tire circumferential direction. Therefore, in the present embodiment, when the mold is cleaned, laser, particles, and the like can be easily applied into the groove portion 25 of the vulcanization mold 21.

Furthermore, according to expression (2), the minimum length C of the gap 12 is set to be not less than 0.15 mm. Thus, in the decorative pattern 7 of the present embodiment, the number of the ridges 11 can be prevented from being excessively increased in the tire circumferential direction. Therefore, in the present embodiment, the proportion of the groove portions 25 of the vulcanization mold 21 can be reduced, thereby improving efficiency for the cleaning.

Thus, in the tire 1 of the present embodiment, the decorative pattern 7 satisfies expressions (1) and (2), whereby both the outer appearance of the tire 1 and efficiency for cleaning the vulcanization mold 21 can be improved.

When the taper angle A is greater than 40 degrees, the incident angle θ1 and the reflection angle θ2 of the light 30 described above are increased at the side surface 16 of the ridge 11. Therefore, reflection from the side surface 16 toward the outside of the tire 1 may not be weakened. Furthermore, on the wall surfaces 28, 28 of the groove portion 25, of the vulcanization mold 21, for forming the ridge 11 as shown in FIG. 3, the incident angles and the reflection angles of laser and particles used for cleaning the vulcanization mold 21 may be increased, and dirt attached to the grove portion 25 may not be efficiently removed.

Meanwhile, when the taper angle A is less than 20 degrees, the wall surfaces 28, 28 of the groove portion 25 cannot be expanded, and efficiency for the cleaning may be reduced in the case of the mold being cleaned. Furthermore, the wall surfaces 28, 28 of the groove portion 25 contact with a bottom surface 27 for forming the top-side shorter base 15 of the ridge 11, at large angles. Therefore, processability for the groove portion 25 may be reduced, and cost for processing the pattern forming portion 24 may be increased. From such a viewpoint, the taper angle A is preferably not less than 25 degrees and preferably not greater than 35 degrees.

When the minimum length C of the gap 12 is greater than 0.25 mm, reflection from the surface 5 of the sidewall portion 3 toward the outside of the tire 1 is increased. Therefore, contrast of light between the ridge 11 and the gap 12 cannot be clarified, and the outer appearance of the tire 1 may be deteriorated. Meanwhile, when the minimum length C of the gap 12 is less than 0.15 mm, the proportion of the groove portions 25 of the vulcanization mold 21 shown in FIG. 3 is increased, and efficiency for the cleaning may be reduced in the case of the mold being cleaned. Furthermore, when the width of the molding surface 23 between the adjacent groove portions 25 and 25 is reduced, cost for processing the pattern forming portion 24 may be increased, and the molding surface 23 may be worn early due to the cleaning. From such a viewpoint, the minimum length C of the gap 12 is preferably not less than 0.18 mm and preferably not greater than 0.22 mm.

In order to further facilitate application of laser, particles, and the like into the groove portions 25 while contrast of light between the ridge 11 and the gap 12 is enhanced, the decorative pattern 7 of the present embodiment is preferably structured so as to satisfy expressions (1) and (2) described above, and further satisfy the following expressions (3) and (4).

$$0.2 \leq C/D \leq 0.4 \quad (3)$$

$$1 \leq B/C \leq 3 \quad (4)$$

wherein B represents a length, of the top-side shorter base 15, measured along the surface 5, and D represents an arrangement pitch at which the ridges 11 are arranged in the tire circumferential direction.

According to expression (3), a ratio C/D of the minimum length C of the gap 12 to the arrangement pitch D for the ridges 11 as shown in FIG. 2 is set to be not greater than 0.4. Thus, the minimum length C of the gap 12 can be formed so as to be sufficiently small relative to the arrangement pitch D for the ridges 11, and reflection from the surface 5 of the sidewall portion 3 toward the outside of the tire 1 can be further weakened.

According to expression (4), a ratio B/C of the length B of the top-side shorter base 15 to the minimum length C of the gap 12 is set to be not greater than 3. Thus, the top-side shorter base 15 can be prevented from being excessively great relative to the gap 12 (surface 5). Therefore, in the decorative pattern 7, the top-side shorter base 15 which is viewed as being bright (white) and the gap 12 which is viewed as being dark (black) are formed in a well-balanced manner. Thus, contrast of light between the ridge 11 and the gap 12 can be further enhanced, and the outer appearance of the tire 1 can be further improved.

According to expression (3), the ratio C/D of the minimum length C of the gap 12 to the arrangement pitch D for the ridges 11 is set to be not less than 0.2. Thus, the width of the molding surface 23 between the adjacent groove portions 25 and 25 can be increased, cost for processing the pattern forming portion 24 can be effectively prevented from increasing, and the molding surface 23 can be effectively prevented from being worn early due to the cleaning.

According to expression (4), the ratio B/C of the length B of the top-side shorter base 15 to the minimum length C of the gap 12 is set to be not less than 1. Thus, in the present embodiment, the length of the bottom surface 27 of the groove portion 25 of the vulcanization mold 21 can be increased in the tire circumferential direction. Therefore, in the present embodiment, laser, particles, and the like can be more easily applied into the groove portions 25 when the mold is cleaned.

Thus, the decorative pattern 7 of the present embodiment satisfies expressions (1) and (2) and further satisfies expressions (3) and (4), whereby both the outer appearance of the tire 1 and efficiency for cleaning the vulcanization mold 21 can be improved at a higher level.

When the ratio C/D of the minimum length C of the gap 12 to the arrangement pitch D for the ridges 11 is greater than 0.4, the minimum length C of the gap 12 is increased relative to the arrangement pitch D for the ridges 11. Therefore, reflection from the surface 5 of the sidewall portion 3 toward the outside of the tire 1 may not be sufficiently weakened. Meanwhile, when the ratio C/D is less than 0.2, the width of the molding surface 23 between the adjacent groove portions 25 and 25 is reduced, and cost for processing the pattern forming portion 24 may not be sufficiently prevented from increasing and the molding surface 23 may not be sufficiently prevented from being worn early due to the cleaning. From such a viewpoint, the ratio C/D is preferably not less than 0.25 and preferably not greater than 0.35.

When the ratio B/C of the length B of the top-side shorter base 15 to the minimum length C of the gap 12 is greater than 3, the top-side shorter base 15 is large in the tire circumferential direction relative to the gap 12 shown in FIG. 2, and contrast of light between the ridge 11 and the gap 12 may not be sufficiently enhanced. Meanwhile, when the ratio B/C is less than 1, the bottom surface 27 of the groove portion 25 of the vulcanization mold 21 shown in FIG. 3 is small, and laser, particles, and the like may not be easily applied into the groove portions 25. Furthermore, cost for processing the pattern forming portion 24 may be increased. From such a viewpoint, the ratio B/C is preferably not less than 1.5 and preferably not greater than 2.5.

The arrangement pitch D for the ridges 11 can be set as appropriate when expression (3) is satisfied. However, the arrangement pitch D for the ridges 11 is preferably set to be 0.13 to 2.1 mm. When the arrangement pitch D is set to be not less than 0.13 mm, the number of the ridges 11 can be prevented from increasing, and the proportion of the groove portions 25 of the vulcanization mold 21 can be reduced. Therefore, efficiency for the cleaning can be further improved when the mold is cleaned.

When the arrangement pitch D is set to be not greater than 2.1 mm, at least one of the top-side shorter base 15 and the gap 12 shown in FIG. 2 can be prevented from being large, so that contrast between the ridge 11 and the gap 12 can be further enhanced. From such a viewpoint, the arrangement pitch D is more preferably not less than 0.3 mm and more preferably not greater than 1.9 mm.

The length B of the top-side shorter base 15 can be set as appropriate when expression (4) is satisfied. However, the length B of the top-side shorter base 15 is preferably set to be 0.05 to 0.40 mm. When the length B of the top-side shorter base 15 is not less than 0.05 mm, the bottom surface 27 of the groove portions 25 of the vulcanization mold 21 shown in FIG. 3 can be made large, and efficiency for the cleaning can be further improved when the mold is cleaned.

When the length B of the top-side shorter base 15 is not greater than 0.40 mm, the top-side shorter base 15 and the gap 12 shown in FIG. 2 are formed in a well-balanced manner. Therefore, contrast of light between the ridge 11 and the gap 12 can be further enhanced. From such a viewpoint, the length B of the top-side shorter base 15 is more preferably not less than 0.10 mm and more preferably not greater than 0.35 mm.

A height E of the ridge 11 from the surface 5 of the sidewall portion 3 can be set as appropriate. However, the height E of the ridge 11 is preferably set to be 0.1 to 0.5 mm. When the height E of the ridge 11 is not less than 0.1 mm, the gap 12 can be viewed as being darker (black). When the height E of the ridge 11 is not greater than 0.5 mm, the groove portions 25 of the vulcanization mold 21 shown in FIG. 3 can be prevented from being deepened. Therefore, efficiency for the cleaning can be further improved. From such a viewpoint, the height E is more preferably not less than 0.15 mm and more preferably not greater than 0.45 mm.

Figure 4:
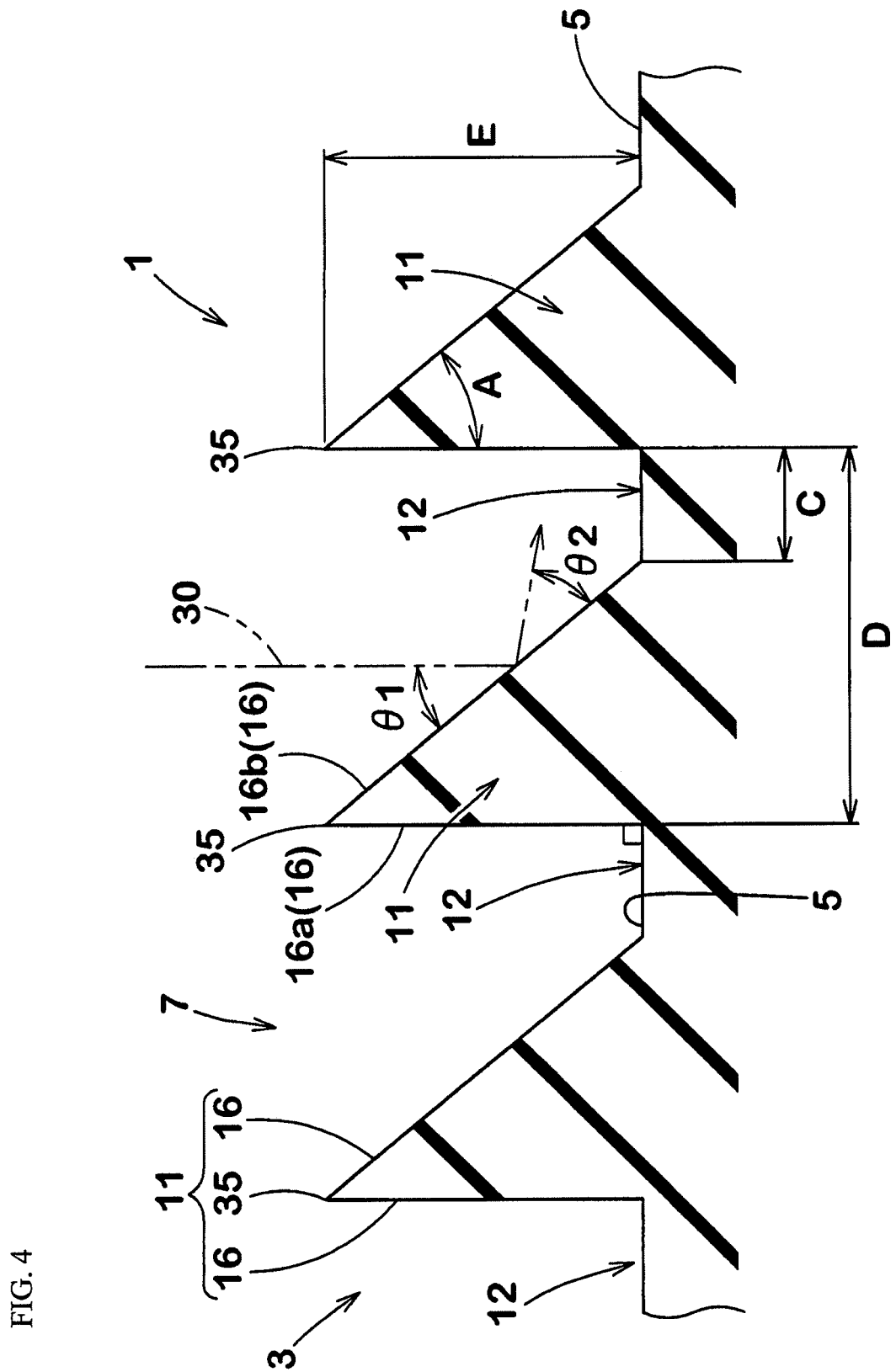
FIG. 4 is a cross-sectional view of an example of a decorative pattern according to another embodiment of the present invention.
Figure 5:
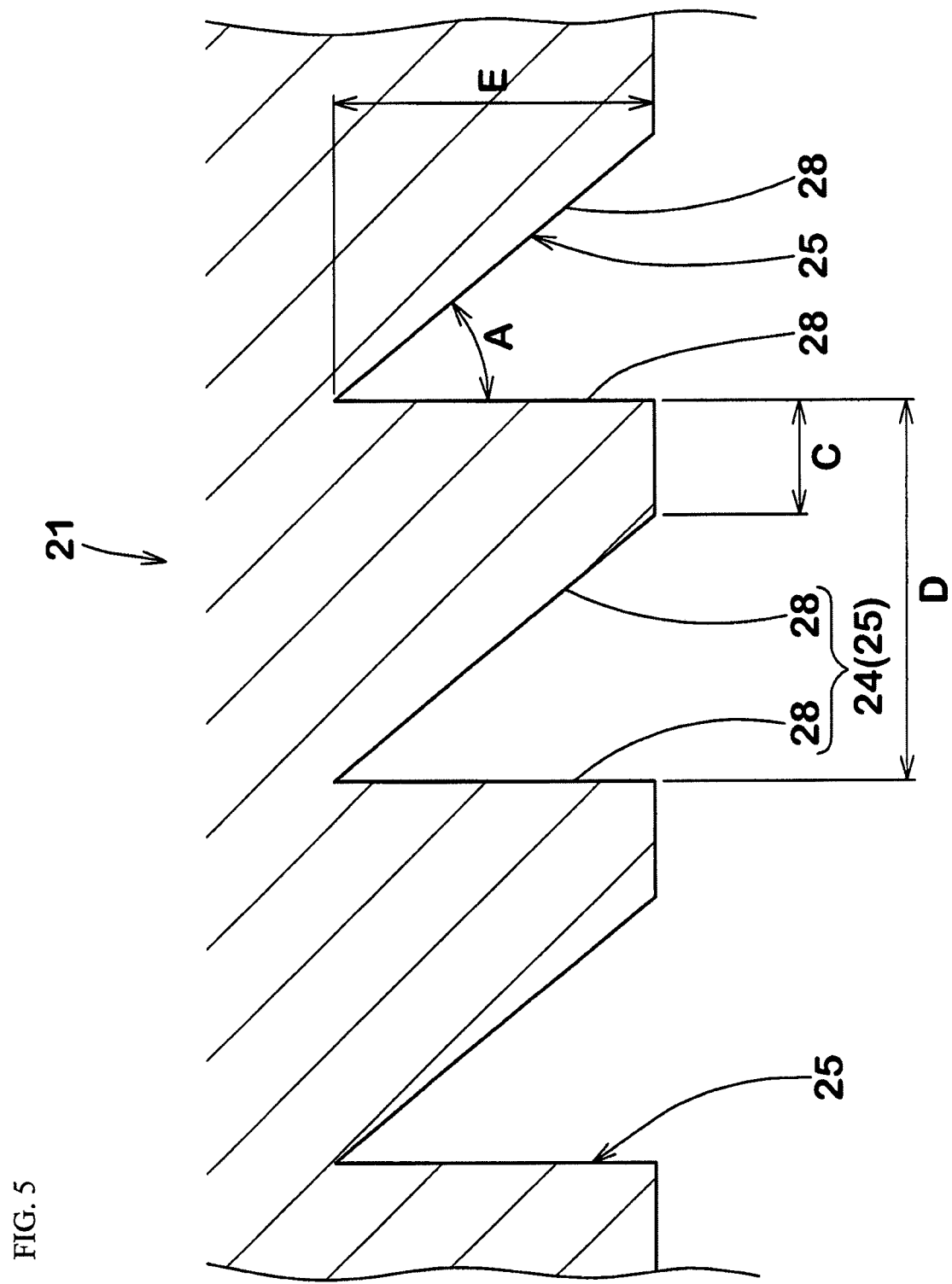
FIG. 5 is a partial cross-sectional view of examples of a vulcanization mold and a green tire in a vulcanization step, according to another embodiment of the present invention.

A case where the transverse cross-section of the ridge 11 has a trapezoidal shape having the top-side shorter base 15 is described as an example in the above-described embodiment. However, the present invention is not limited to such an example. FIG. 4 is a cross-sectional view of an example of the decorative pattern 7 according to another embodiment of the present invention. FIG. 5 is a partial cross-sectional view of an example of the pattern forming portion 24 according to another embodiment of the present invention. In the present embodiment, the same components as in the above-described embodiment are denoted by the same reference numerals, and the description thereof may be omitted.

In the present embodiment, the transverse cross-section of the ridge 11 is formed in a triangular shape having a vertex 35 at a position farthest from the surface 5 of the sidewall portion 3. Furthermore, the transverse cross-section of the ridge 11 has a pair of side surfaces 16, 16 that extend from the vertex 35 to the surface 5. Examples of the triangular shape include a shape in which a part of the vertex 35 of the triangular shape has a small chamfered portion, in consideration of the size of the ridge 11 and a rubber forming technique.

The decorative pattern 7 of the present embodiment can function to hide recesses and projections (not shown) formed in the sidewall portion 3 so as to inhibit the recesses and projections from becoming conspicuous, similarly to the decorative pattern 7 of the above-described embodiment. Furthermore, in the decorative pattern 7 of the present embodiment, the ridge 11 has a triangular transverse cross-section, and, thus, the vertex 35 of each ridge 11 can be formed so as to be sharp and have a good appearance. Therefore, the decorative pattern 7 contributes to improvement of the outer appearance of the tire 1.

The decorative pattern 7 of the present embodiment is structured such that the taper angle A of the ridge 11 and the minimum length C of the gap 12 satisfy expressions (1) and (2) described above. Thus, the decorative pattern 7 of the present embodiment allows improvement of both the outer appearance of the tire 1 and efficiency for cleaning the vulcanization mold 21 shown in FIG. 5, similarly to the decorative pattern 7 of the above-described embodiment. Preferable ranges of the taper angle A and the minimum length C are the same as the preferable ranges of the taper angle A and the minimum length C in the above-described embodiment.

Furthermore, the decorative pattern 7 of the present embodiment is preferably structured so as to satisfy expressions (1) and (2) described above, and further satisfy the following expression (5).

$$0.2 \le C/D \le 0.4 \tag{5}$$

wherein D represents an arrangement pitch at which the ridges 11 are arranged in the tire circumferential direction.

Expression (5) defines a range of the ratio C/D of the minimum length C of the gap 12 to the arrangement pitch D for the ridges 11, similarly to expression (3) of the above-described embodiment. Thus, laser, particles, and the like can be more easily applied into the groove portions 25 while contrast of light between the ridge 11 and the gap 12 is further enhanced.

Thus, when the decorative pattern 7 of the present embodiment satisfies expressions (1) and (2) described above, and further satisfies expression (5), both the outer appearance of the tire 1 and efficiency for cleaning the vulcanization mold 21 can be improved at a higher level. Preferable ranges of the ratio C/D of the minimum length C of the gap 12 to the arrangement pitch D for the ridges 11, and the arrangement pitch D for the ridges 11 are the same as the preferable ranges of the ratio C/D and the arrangement pitch D, respectively, of the above-described embodiment.

As shown in FIG. 4, in the ridge 11, one side surface 16*a* of the paired side surfaces 16*a* and 16*b* may be orthogonal to the surface 5 of the sidewall portion 3. Thus, the transverse cross-section of the ridge 11 of the present embodiment is shaped into a right triangle.

The ridge 11 having such a structure allows an incident angle (not shown) and a reflection angle (not shown) of the light 30 (indicated by an alternate long and two short dashes line in FIG. 4) described above to be almost zero at the one side surface 16*a*. Thus, the decorative pattern 7 allows reflection from the one side surface 16*a* toward the outside of the tire 1 to be effectively weakened. Meanwhile, an incident angle θ1 and a reflection angle θ2 of the light 30 can be slightly increased at the other side surface 16*b* which is not orthogonal to the surface 5, as compared to the above-described embodiment. Thus, the decorative pattern 7 allows reflection from the other side surface 16*b* toward the outside of the tire 1 to be slightly enhanced. Therefore, the decorative pattern 7 of the present embodiment allows the intensity of the reflection to be made different among the side surfaces 16*a* and 16*b*, and the surface 5, to diversify contrast of light. Therefore, the outer appearance of the tire can be improved.

The decorative pattern 7 structured such that the ridge 11 has the trapezoidal transverse cross-section (shown in FIG. 2) and the decorative pattern 7 structured such that the ridge 11 has the triangular transverse cross-section (shown in FIG. 4) are illustrated for these embodiments. However, the present invention is not limited thereto. The decorative pattern 7 may be structured by, for example, the ridge 11 having a trapezoidal transverse cross-section and the ridge 11 having a triangular transverse cross-section being used in combination. Thus, the decorative pattern 7 allows diversity of contrast of light to be further improved, thereby further improving the outer appearance of the tire 1.

Although the preferred embodiments of the present invention have been described in detail above, the present invention is not limited to the above-described embodiments shown in the drawings, and various modifications can be made to practice the present invention.

EXAMPLES

Tires (size: 195/65R15) were produced as sample tires according to specifications indicated in Table 1 such that the decorative patterns were formed on surfaces of the sidewall portions (examples 1 to 10 and comparative examples 1 to 12). The tires of examples and comparative examples were each evaluated for processability for the pattern forming portion (groove) of the vulcanization mold, cost for processing the pattern forming portion of the vulcanization mold, outer appearance of the tire, performance of hiding recesses and projections, efficiency for cleaning the vulcanization mold, and outer appearance of the tire after the pattern forming portion of the vulcanization mold was worn. The evaluation methods are as follows.

<Processability for Pattern Forming Portion (Groove) of Vulcanization Mold, and Cost for Processing Pattern Forming Portion (Groove) of Vulcanization Mold>

A time and cost required for processing the pattern forming portion (groove) of the vulcanization mold, in the molding surface of the vulcanization mold, were obtained. The evaluation is indicated as an index with the index of example 2 being 100. The greater the value of the index is, the better the evaluation is.

<Outer Appearance of Tire>

Clarity of contrast of light at the decorative pattern was evaluated through visual inspection by a tester when the tire was viewed from the side surface in a state where each tire was inflated to an internal pressure of 200 kPa. The evaluation is indicated as an index with the index of comparative example 10 being 100. The greater the value of the index is, the better the evaluation is.

<Performance of Hiding Recesses and Projections>

Inconspicuousness of recesses and projections formed in the sidewall portion was evaluated through visual inspection by a tester in a state where each tire was inflated to an internal pressure of 200 kPa. The evaluation is indicated as an index with the index of comparative example 10 being 100. The greater the value of the index is, the better the evaluation is.

<Efficiency for Cleaning Vulcanization Mold (Laser, Shot Blasting)>

Easiness of cleaning the pattern forming portion (groove) of the vulcanization mold was evaluated by using a laser cleaning device and shot blasting devices 1, 2 after each tire was vulcanized and molded. In the evaluation, "OK" represents a case where the cleaning was able to be performed, and "NG" represents a case where the cleaning was difficult. Particles and particle diameters in the shot blasting devices 1, 2 are as follows.

Shot blasting device 1: particle: steel, particle diameter: 0.044 to 0.1 mm

Shot blasting device 2: particle: plastic, particle diameter: 0.17 to 0.5 mm

<Outer Appearance of Tire after Pattern Forming Portion of Vulcanization Mold was Worn>

After particles for three years were applied to the pattern forming portion (groove) of the vulcanization mold by using the shot blasting device 1, each tire was produced by using the vulcanization mold. Clarity of contrast of light at the decorative pattern was evaluated through visual inspection by a tester when each tire was viewed from the side surface in a state where the tire was inflated to an internal pressure of 200 kPa. In the evaluation, "OK" represents a case where almost no change occurred between a state where the pattern forming portion was worn and a state where the pattern forming portion was not worn, and "NG" represents a case where change was great therebetween. The results of the test are indicated in Table 1.

TABLE 1

|  | Comp. Ex. 1 | Comp. Ex. 2 | Comp. Ex. 3 | Comp. Ex. 4 | Comp. Ex. 5 | Comp. Ex. 6 | Example 1 | Comp. Ex. 7 | Example 2 |
|---|---|---|---|---|---|---|---|---|---|
| Transverse cross-section of ridge | FIG. 2 | FIG. 2 | FIG. 2 | FIG. 2 | FIG. 2 | FIG. 2 | FIG. 2 | FIG. 2 | FIG. 2 |
| Taper angle A of ridge (degree) | 0 | 20 | 20 | 20 | 20 | 20 | 20 | 30 | 30 |
| Length B of top-side shorter base (mm) | 0.40 | 0.05 | 0.05 | 0.05 | 0.05 | 0.05 | 0.40 | 0.20 | 0.30 |
| Minimum length C of gap (mm) | 0.60 | 0.13 | 0.12 | 0.08 | 0.05 | 0.32 | 0.20 | 0.10 | 0.20 |
| B/C | 0.67 | 0.38 | 0.42 | 0.63 | 1.11 | 0.16 | 2.00 | 2.00 | 1.50 |
| Arrangement pitch D for ridges (mm) | 1.00 | 0.22 | 0.24 | 0.27 | 0.17 | 0.44 | 0.70 | 0.50 | 0.70 |
| C/D | 0.60 | 0.60 | 0.50 | 0.30 | 0.27 | 0.72 | 0.29 | 0.20 | 0.29 |
| Height E of ridge (mm) | 0.30 | 0.10 | 0.20 | 0.40 | 0.20 | 0.20 | 0.30 | 0.30 | 0.30 |
| Processability for pattern forming portion (groove) (index) | 20 | 100 | 100 | 100 | 100 | 100 | 50 | 100 | 100 |
| Cost for processing pattern forming portion (groove) (index) | 70 | 30 | 30 | 30 | 30 | 30 | 100 | 100 | 100 |
| Outer appearance of tire (index) | 110 | 120 | 150 | 150 | 140 | 120 | 115 | 130 | 120 |
| Performance of hiding recesses and projections (index) | 110 | 110 | 110 | 110 | 110 | 110 | 110 | 110 | 110 |
| Efficiency for cleaning (laser) | OK | NG | NG | NG | NG | NG | OK | OK | OK |
| Efficiency for cleaning (shot blasting 1) | OK | NG | NG | NG | NG | NG | OK | OK | OK |
| Efficiency for cleaning (shot blasting 2) | NG | NG | NG | NG | NG | NG | OK | NG | OK |
| Outer appearance of tire after wear | OK | NG | NG | NG | NG | NG | OK | OK | OK |

|  | Comp. Ex. 8 | Comp. Ex. 9 | Comp. Ex. 10 | Comp. Ex. 11 | Exampel 3 | Example 4 | Example 5 | Example 6 | Example 7 |
|---|---|---|---|---|---|---|---|---|---|
| Transverse cross-section of ridge | FIG. 2 | FIG. 2 | FIG. 2 | FIG. 2 | FIG. 2 | FIG. 2 | FIG. 2 | FIG. 2 | FIG. 2 |
| Taper angle A of ridge (degree) | 30 | 60 | 90 | 90 | 40 | 30 | 30 | 30 | 30 |
| Length B of top-side shorter base (mm) | 0.40 | 0.30 | 0.20 | 0.20 | 0.30 | 0.30 | 0.30 | 0.30 | 0.30 |
| Minimum length C of gap (mm) | 0.70 | 0.60 | 0.20 | 0.00 | 0.20 | 0.15 | 0.25 | 0.14 | 0.28 |
| B/C | 0.57 | 0.50 | 1.00 | — | 1.50 | 2.00 | 1.20 | 2.14 | 1.07 |
| Arrangement pitch D for ridges (mm) | 1.30 | 1.40 | 1.20 | 1.00 | 0.70 | 0.70 | 0.70 | 0.70 | 0.70 |
| C/D | 0.54 | 0.43 | 0.17 | 0.00 | 0.29 | 0.21 | 0.36 | 0.20 | 0.40 |
| Height E of ridge (mm) | 0.30 | 0.40 | 0.40 | 0.40 | 0.30 | 0.30 | 0.30 | 0.30 | 0.30 |
| Processability for pattern forming portion (groove) (index) | 100 | 100 | 100 | 100 | 100 | 100 | 100 | 100 | 100 |
| Cost for processing pattern forming portion (groove) (index) | 100 | 100 | 100 | 100 | 100 | 100 | 100 | 100 | 100 |
| Outer appearance of tire (index) | 105 | 100 | 100 | 110 | 115 | 123 | 115 | 123 | 115 |
| Performance of hiding recesses and projections (index) | 105 | 100 | 100 | 100 | 110 | 110 | 110 | 110 | 110 |
| Efficiency for cleaning (laser) | OK | OK | OK | OK | OK | OK | OK | OK | OK |
| Efficiency for cleaning (shot blasting 1) | OK | OK | OK | OK | OK | OK | OK | OK | OK |
| Efficiency for cleaning (shot blasting 2) | OK | OK | OK | OK | OK | OK | OK | OK | OK |
| Outer appearance of tire after wear | OK | OK | OK | NG | OK | OK | OK | OK | OK |

|  | Example 8 | Example 9 | Example 10 |
|---|---|---|---|
| Transverse cross-section of ridge | FIG. 2 | FIG. 2 | FIG. 4 |
| Taper angle A of ridge (degree) | 30 | 30 | 30 |
| Length B of top-side shorter base (mm) | 0.20 | 0.60 | — |
| Minimum length C of gap (mm) | 0.20 | 0.20 | 0.20 |
| B/C | 1.00 | 3.00 | — |
| Arrangement pitch D for ridges (mm) | 0.70 | 0.70 | 0.70 |
| C/D | 0.29 | 0.29 | 0.29 |
| Height E of ridge (mm) | 0.30 | 0.30 | 0.30 |
| Processability for pattern forming portion (groove) (index) | 100 | 100 | 100 |
| Cost for processing pattern forming portion (groove) (index) | 90 | 100 | 100 |
| Outer appearance of tire (index) | 123 | 115 | 130 |
| Performance of hiding recesses and projections (index) | 115 | 110 | 115 |
| Efficiency for cleaning (laser) | OK | OK | OK |
| Efficiency for cleaning (shot blasting 1) | OK | OK | OK |
| Efficiency for cleaning (shot blasting 2) | OK | OK | OK |
| Outer appearance of tire after wear | OK | OK | OK |

The results of the test indicate that, in each example, performance for hiding recesses and projections was superior, and both outer appearance of the tire and efficiency for cleaning the vulcanization mold were improved as compared to comparative examples. Furthermore, in each example, the outer appearance of the tire was able to be maintained after the pattern forming portion of the vulcanization mold was worn, as compared to comparative examples. Furthermore, in each example, processability for the pattern forming portion (groove) of the vulcanization mold was excellent and cost for the processing was able to be reduced.

What is claimed is:

1. A tire comprising
a decorative pattern formed on a surface of a sidewall portion, wherein
the decorative pattern is formed such that a plurality of ridges that extend in a tire radial direction are aligned in a tire circumferential direction so as to form gaps between the ridges,
a transverse cross-section of each ridge is tapered so as to gradually reduce a length of the ridge along the surface such that the greater a distance from the surface is, the less the length along the surface is, and the transverse cross-section of the ridge has a right triangular shape,
the decorative pattern is structed so as to satisfy the following expressions, $20 \le A \le 40$, $0.15 \le C \le 0.25$, $0.3 \le D \le 0.70$, and $0.2 \le C/D \le 0.4$, wherein A represents a taper angle (degree) of the ridge, and C represents a minimum length (mm), of each gap, measured along the surface, and D represents an arrangement pitch (mm) at which the ridges are arranged in the tire circumferential direction,
wherein a height of the ridge from the surface along a side of the right triangular shape that is perpendicular to the surface is greater than a width of the ridge at a base of the right triangular shape,
wherein at least one side of each ridge reflects light that is incident on the at least one side surface to weaken light reflectance from a respective gap toward an outside of the tire, so that the gaps have a darker appearance compared to the ridges.

2. The tire according to claim 1, wherein the transverse cross-section of the ridge has the right triangular shape having a vertex at a position that is farthest from the surface.

3. The tire according to claim 2, wherein one of paired side surfaces that extend from the vertex to the surface is orthogonal to the surface.

4. The tire according to claim 2, wherein a height of the ridge from the surface is 0.1 to 0.5 mm.

5. The tire according to claim 1, wherein a height of the ridge from the surface is 0.1 to 0.5 mm.

6. The tire according to claim 1, wherein the gaps each have a black appearance.

7. The tire according to claim 1, wherein the decorative pattern hides recesses and projections in the sidewall portion caused by residual air and a joint portion of a carcass of the tire.

8. The tire according to claim 1, wherein
a length of the decorative pattern in the tire radial direction is 5 to 30% of a cross-sectional height of the tire.

9. The tire according to claim 1, wherein the height of the ridge from the surface is greater than or equal to 0.1 and less than 0.3 mm.

10. The tire according to claim 1, wherein the decorative pattern is annular and only includes the ridges that extend in the radial direction so that all of the ridges include the same transverse cross-section.

11. A tire comprising:
a decorative pattern formed on a surface of a sidewall portion, wherein
the decorative pattern is formed such that a plurality of ridges that extend in a tire radial direction are aligned in a tire circumferential direction so as to form gaps between the ridges,
a transverse cross-section of each ridge is tapered so as to gradually reduce a length of the ridge along the surface such that the greater a distance from the surface is, the less the length along the surface is, the decorative pattern is structured so as to satisfy the following expressions, $20 \le A \le 40$, $0.15 \le C \le 0.25$, $0.3 \le D \le 0.70$, and $0.2 \le C/D \le 0.4$, wherein A represents a taper angle (degree) of the ridge, C represents a minimum length (mm), of each gap, measured along the surface, and D represents an arrangement pitch (mm) at which the ridges are arranged in the tire circumferential direction,
wherein at least one side surface of each ridge reflects light that is incident on the at least one side surface to weaken light reflectance from a respective gap toward an outside of the tire, so that the gaps have a darker appearance compared to the ridges,
wherein a length of the decorative pattern in the tire radial direction is 5 to 30% of a cross-sectional height of the tire,
wherein the decorative pattern is annular and only includes the ridges that extend in the radial direction so that all of the ridges include the same transverse cross-section.

12. The tire according to claim 11, wherein
the transverse cross-section of the ridge has a top-side shorter base that extends along the surface, at a position that is farthest from the surface, and the decorative pattern is structured so as to further satisfy the following expressions, $25 \le A \le 35$, and $1.5 \le B/C \le 2.5$, wherein B represents a length (mm), of the top-side shorter base, measured along the surface.

13. The tire according to claim 12, wherein the length B of the top-side shorter base is 0.05 to 0.4 mm.

14. A tire comprising:
a decorative pattern formed on a surface of a sidewall portion, wherein the decorative pattern is formed such that a plurality of ridges that extend in a tire radial direction are aligned in a tire circumferential direction so as to form gaps between the ridges, a transverse cross-section of each ridge is tapered so as to gradually reduce a length of the ridge along the surface such that the greater a distance from the surface is, the less the length along the surface is, and the transverse cross-section of the ridge has a top-side shorter base that extends along the surface, at a position that is farthest from the surface, the decorative pattern is structured so as to satisfy the following expressions, $25 \leq A \leq 35$, $1.5 \leq B/C \leq 2.5$, $0.15 \leq D \leq 0.25$, $0.3 \leq D \leq 0.70$, and $0.2 \leq C/D \leq 0.4$, wherein A represents a taper angle (degree) of the ridge, B represents a length (mm), of the top-side shorter base, measured along the surface, C represents a minimum length (mm), of each gap, measured along the surface, and D represents an arrangement pitch (mm) at which the ridges are arranged in the tire circumferential direction, wherein at least one side surface of each ridge reflects light that is incident on the at least one side surface to weaken light reflectance from a respective gap toward an outside of the tire, so that the gaps have a darker appearance compared to the ridges;

wherein the decorative pattern is annular and only includes the ridges that extend in the radial direction so that all of the ridges include the same transverse cross-section.

15. The tire according to claim 14, wherein the length B of the top-side shorter base is 0.05 to 0.4 mm.

16. The tire according to claim 14, wherein
the decorative pattern is structured so as to further satisfy the following expression, $2.00 \leq B/C \leq 2.14$.

* * * * *